US006863477B2

(12) United States Patent
Jenkins et al.

(10) Patent No.: US 6,863,477 B2
(45) Date of Patent: Mar. 8, 2005

(54) METHOD AND MATERIAL FOR PREVENTING EROSION AND MAINTAINING PLAYABILITY OF GOLF COURSE SAND BUNKERS

(75) Inventors: Christopher Jenkins, Harlem, GA (US); Gary A. Henderson, Evans, GA (US)

(73) Assignee: Continental Commercial Products, LLC, St. Louis, MO (US)

( * ) Notice: Subject to any disclaimer, the term of this patent is extended or adjusted under 35 U.S.C. 154(b) by 65 days.

(21) Appl. No.: 10/365,005

(22) Filed: Feb. 12, 2003

(65) Prior Publication Data

US 2004/0156679 A1 Aug. 12, 2004

(51) Int. Cl.$^7$ ............................ E02D 17/00; E02B 13/00
(52) U.S. Cl. ...................... 405/302.6; 405/32; 405/43; 405/302.7; 442/327; 442/366
(58) Field of Search .................. 405/32, 36, 258.1, 405/302.6, 302.7, 43; 428/253, 257, 357, 489; 442/366, 367, 327

(56) References Cited

U.S. PATENT DOCUMENTS

| 3,003,643 | A | * | 10/1961 | Thomas ....................... 405/45 |
| 3,245,854 | A | | 4/1966 | Etchison et al. |
| 3,670,506 | A | | 6/1972 | Gaudard |

(List continued on next page.)

FOREIGN PATENT DOCUMENTS

| GB | 2035098 | * | 6/1980 | .................. 405/36 |

OTHER PUBLICATIONS

Stabilizer Bunker Seal Product Information, Stabilizer Solutions Web site, www.stabilizersolutions.com, undated.
What is Bunker Woll®? (Product Information), BunkerNet Inc. Web site, www.bunkernet.dreamhost.com, undated.
Sand Trapper Product Information, Sandtrapper Web site, www.sandtrapper.com, undated.
Teresa Carson, Turf Talk, Bunkers: The Bottom Line, Sep. 2002, p. 28.
Andrea C. Bakalyar, Supertips, Bunker Liners, Sep. 2002, p. 30.
Sand daM, Erosion Control Blankets For Sand Bunkers (Product Information), Dec. 2000.

*Primary Examiner*—Jong-Suk (James) Lee
(74) *Attorney, Agent, or Firm*—Thompson Coburn, LLP

(57) ABSTRACT

A method and material for preventing erosion and maintaining playability of golf course sand bunkers. A geotextile liner is formed of two water-permeable layers. A first non-woven layer of randomly-aligned, synthetic fibers is configured and adapted to maintain sand in place within a sand bunker. A second backing layer formed of spunbond synthetic fiber is impervious to sand and configured and adapted to prevent downward migration of sand through the liner, while also preventing the upward migration of weeds, rocks and other contaminants that hinder the playability of the sand bunker. The backing layer also permits seams between adjacent sections of the liner to be joined by staples that penetrate the second layer but do not penetrate the native soil. Sections of the liner are laid within an unfilled sand bunker, and cut to fit the contours of the bunker as necessary. The liner is anchored to the bunker base using a plurality of sod staples, and seams between adjacent sections of the liner are joined using staples that are not sod staples and are configured and adapted to penetrate the backing layer of the liner but not penetrate soil. The staples used to join the seams between adjacent sections of the liner may be installed using a hand-held, pneumatic stapler.

29 Claims, 5 Drawing Sheets

U.S. PATENT DOCUMENTS

| | | | |
|---|---|---|---|
| 3,770,562 A | | 11/1973 | Newman |
| 4,610,568 A | * | 9/1986 | Koerner .................... 405/302.6 |
| 4,935,295 A | | 6/1990 | Serafini |
| 4,960,345 A | | 10/1990 | Hurley et al. |
| 5,334,446 A | * | 8/1994 | Quantrille et al. ............. 442/35 |
| 5,350,255 A | * | 9/1994 | Carriker ...................... 405/270 |
| 5,401,552 A | | 3/1995 | Bohrer et al. |
| 5,507,900 A | * | 4/1996 | Mohammed et al. ........ 428/192 |
| 5,584,609 A | * | 12/1996 | Clarey et al. ............. 405/302.7 |
| 5,651,641 A | | 7/1997 | Stephens et al. |
| 5,746,546 A | * | 5/1998 | Hubbs et al. ................ 405/263 |
| 5,795,099 A | | 8/1998 | Parker |
| 5,806,154 A | | 9/1998 | Tolbert |
| 5,925,581 A | | 7/1999 | Tolbert |
| 6,135,672 A | * | 10/2000 | Davidson .................. 405/302.6 |
| 6,267,252 B1 | * | 7/2001 | Amsler ........................ 210/490 |
| 6,347,913 B2 | * | 2/2002 | Delmas et al. ........... 405/302.7 |
| 6,467,991 B1 | | 10/2002 | Joyce et al. |
| 6,537,930 B1 | * | 3/2003 | Middlesworth et al. ........ 442/39 |
| 2002/0065013 A1 | | 5/2002 | Porterfield et al. |
| 2002/0124367 A1 | | 9/2002 | Wong |
| 2002/0168910 A1 | | 11/2002 | Vuillaume et al. |
| 2002/0172814 A1 | * | 11/2002 | Norbert et al. .............. 428/213 |
| 2003/0082004 A1 | * | 5/2003 | Wilkerson ................... 405/43 |

* cited by examiner

METHOD AND MATERIAL FOR PREVENTING EROSION AND MAINTAINING PLAYABILITY OF GOLF COURSE SAND BUNKERS

FIELD OF THE INVENTION

The present invention relates generally to golf course construction and maintenance and, more specifically, to a geotextile liner for preventing erosion and maintaining playability of sand bunkers, or traps, on golf courses and a method for installing same.

BACKGROUND OF THE INVENTION

Sand bunkers, or sand traps, are an integral part of almost every golf course. Course designers often use many bunkers of various shapes and sizes to both enhance the aesthetic beauty and increase the level of difficulty of a given course. But sand bunkers also present several challenges to golf course maintenance crews. First, sand often washes down the sides of steep-faced bunkers, sometimes washing completely out of the bunker during heavy rains and leaving the bunker in an unplayable state. New sand must then be added to the bunker and hand raked onto the bunker faces—a time-consuming process for the maintenance crew.

Second, the fine-textured, lightly-colored sand preferred by course designers and players may become discolored by darker-colored underlying soil or contaminated by pebbles and rocks that migrate upward to the playing surface over time. Such contaminants are not only unsightly, but create inconsistent playing conditions and cause damage to golf equipment.

Third, bunker sand can often migrate downward and clog the drainage tiles within the base of the bunker. This will prevent the bunker from draining properly and will often result in standing water within the bunker, forcing the maintenance crew to completely empty the bunker, unclog and renovate the drainage system, and refill the bunker with sand.

Finally, unsightly weeds originating in the native soil can often sprout up through the sand layer in a bunker to compromise both the aesthetics and playability of the hazard. Given these various problems, it is no wonder that the cost of bunker maintenance is typically the largest item in a course maintenance budget.

Prior art bunker maintenance methods and materials include liquid, spray-on products, e.g., U.S. Pat. No. 6,467,991 to Joyce et al., and erosion control mats formed of natural and synthetic fibers. But these prior art methods fail to address all of the bunker maintenance issues discussed above. For example, prior art erosion control mats, which are used to line unfilled bunkers and then covered by the playing sand, do not prevent the downward migration of sand toward drainage tiles and the upward migration of pebbles and soil to the playing surface. In addition, these mats require a great deal of hand labor to install since they are laid in sections and must be anchored to the native soil with many hand-driven sod staples, especially along the seams between adjacent sections of the mat.

Thus, there exists a need for a labor-saving method and material for preventing erosion and maintaining playability of golf course sand bunkers that will (1) prevent sand from washing out of bunkers during heavy rains, especially on steep slopes, (2) prevent contamination of the playing sand with pebbles and other contaminants from the adjacent and/or underlying native soil, (2) prevent sand from clogging drainage tiles within the bunker, and (4) act as a weed blocker.

SUMMARY OF THE INVENTION

In a preferred embodiment, the present invention relates to a geotextile liner for preventing erosion and maintaining playability of golf course sand bunkers. The liner is formed of two water-permeable layers: (1) a first coarse, non-woven layer formed of randomly-aligned, synthetic fibers, the first layer configured and adapted to maintain sand in place within a sand bunker; and (2) a second backing layer formed of spunbond synthetic fiber secured to the first layer, the second layer configured and adapted to prevent downward migration of sand through the liner, while also preventing the upward migration of weeds, rocks and other contaminants that hinder the playability of the sand bunker. The second layer is preferably configured and adapted to permit seams between adjacent sections of the liner to be joined by staples that penetrate the second layer but do not penetrate the native soil. The second layer may be attached to the first layer by needlepunching the second layer to the first layer, and then spraying the composite liner with a bonding resin, oven-drying and curing. On one embodiment, both the first and second layers are formed of polyester fibers. In alternate embodiments, the second layer may be secured to the first layer by an adhesive, or may be formed of thermally bondable fibers, needlepunched into a spunbond scrim backing layer, which act like a hot melt adhesive when heat activated to bond adjacent fibers together.

In another preferred embodiment, the present invention relates to a method of installing a liner for preventing erosion and maintaining playability of a golf course sand bunker. Sections of a water-permeable liner, which has a backing layer that is impervious to sand, are laid within an unfilled sand bunker, and cut to fit the contours of the bunker as necessary. The liner is anchored to the bunker base using a plurality of sod staples, and seams between adjacent sections of the liner are joined using staples that are not sod staples and are configured and adapted to penetrate the backing layer of the liner but not penetrate soil. The legs of the sod staples are longer than the legs of the staples used to join the seams between adjacent sections of the liner. The staples used to join the seams between adjacent sections of the liner may be installed using a hand-held, pneumatic stapler, and the legs of the staples used to join the seams between adjacent sections of the liner fold toward one another after penetrating the backing layer of adjacent sections of the liner. The liner may further comprise a non-woven layer formed of randomly-aligned, synthetic fibers, the non-woven layer configured and adapted for maintaining sand in place within the sand bunker, and the backing layer may be formed of a spunbond synthetic fiber secured to the first layer. In one application, the backing layer is separated and removed from the non-woven layer at a perimeter edge of the bunker to permit sod to adhere to the liner.

BRIEF DESCRIPTION OF THE DRAWINGS

The present invention will be understood and appreciated more fully from the following detailed description, taken in conjunction with the drawings in which.

DESCRIPTION OF THE PREFERRED EMBODIMENTS

Figure 1:
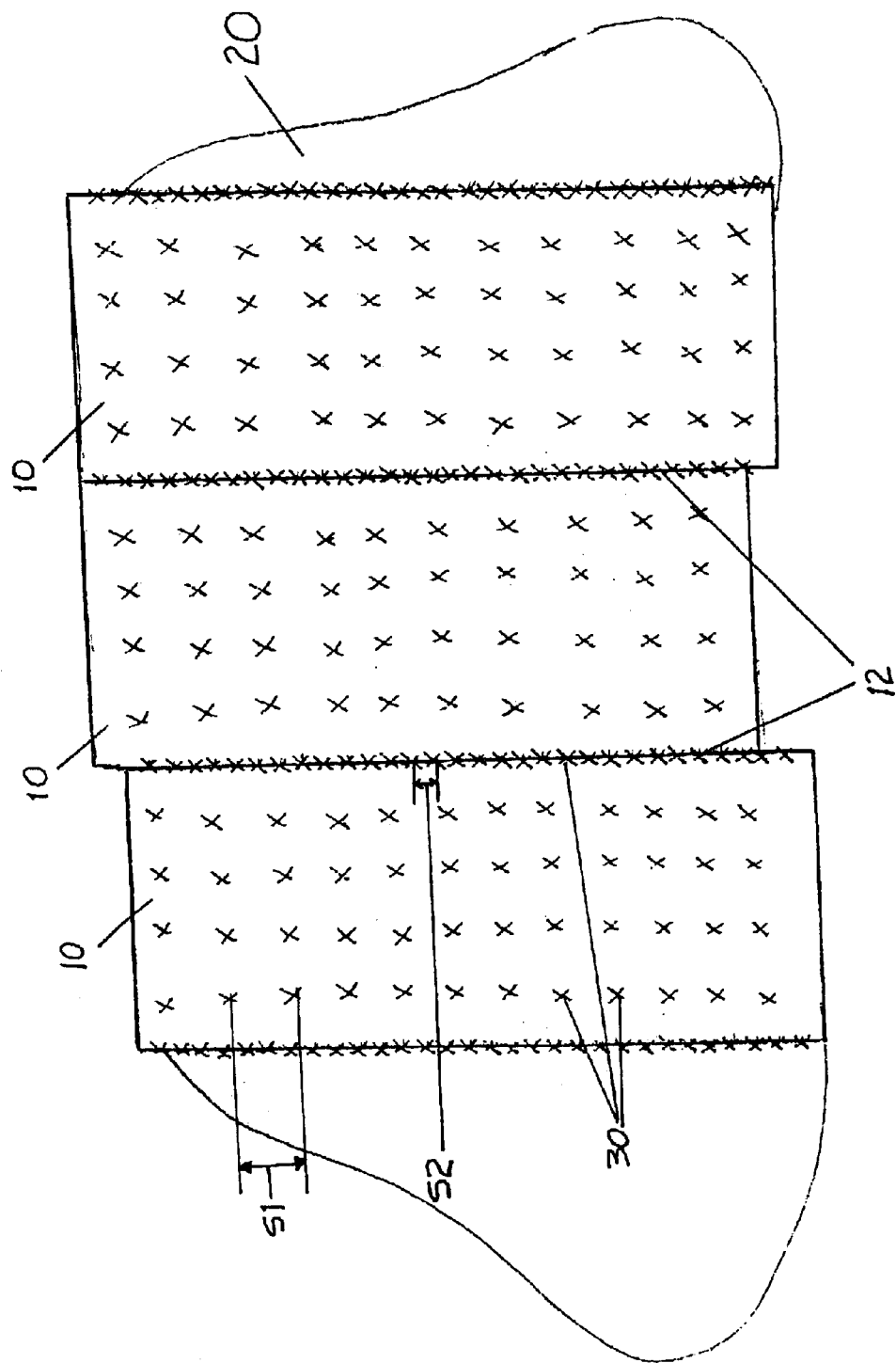
FIG. 1 is a top view of an unfilled sand bunker illustrating a prior art method for installing an erosion control fabric.
Figure 4:
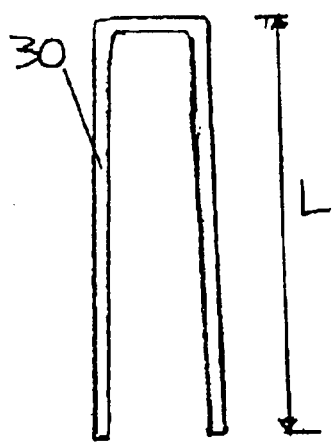
FIG. 4 is a side view of a typical sod staple.

Reference is now made to FIG. 1, which is an illustration of a prior art method for installing an erosion control mat in a golf course sand bunker. A plurality of sheets of erosion control fabric 10 are laid within an unfilled sand bunker 20. Sheets 10 are anchored to the underlying soil using sod staples 30, which as known in the art, are hand-driven, "u-shaped" objects typically on the order of six to twelve inches in length and formed of heavy gauge wire, e.g., 11 gauge. The length of sod staple used in a given application will depend on the soil conditions at the bunker site, e.g., type of substrate, hardness, etc. FIG. 4 shows a typical sod staple 30 having a length L, which may range from six to twelve inches. As shown in FIG. 1, prior art installation guides recommend securing sheets 10 to the underlying soil with sod staples spaced a distance S1 within a given sheet 10. S1 is typically on the order of twelve inches. The seams 12 between adjacent sheets 10 are joined with sod staples 30 spaced a distance S2, where S2 is less than S1, and is typically on the order of three to six inches. Thus, in the prior art, a user must install at least twice the number of hand-driven sod staples 30 along the seams between sheets 10 than within a given sheet 10. Since erosion control mats are typically sold in rolls three to six feet wide, there are many seams to be joined within even an average size bunker of 20 feet in width. Since hammering a typical eight-inch sod staple through sheet 10 and into the earth is a time consuming process, any reduction in the number of sod staples needed for a given installation results in a significant savings in both time and money.

Figure 2A:
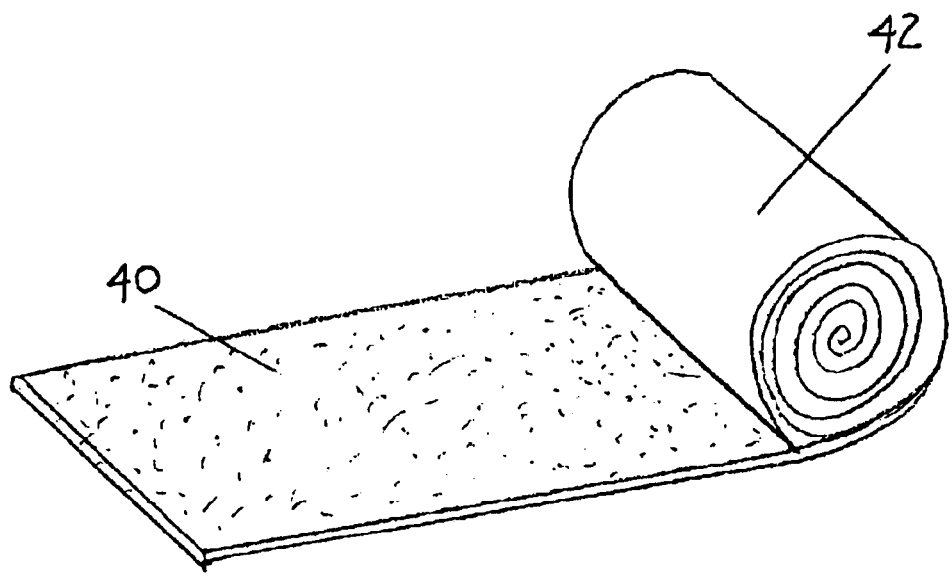
FIG. 2A is an isometric view of a roll of a sand bunker liner of the present invention.
Figure 2B:
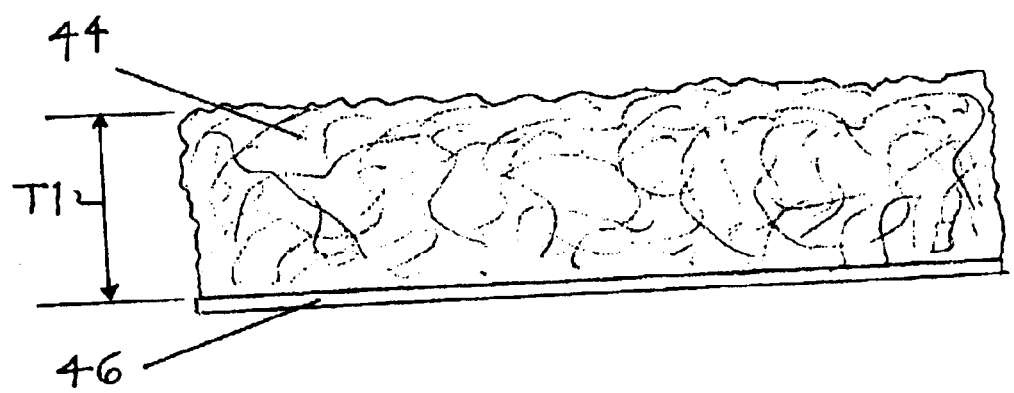
FIG. 2B is cross-sectional view of the sand bunker liner shown in FIG. 2A.
Figure 2C:
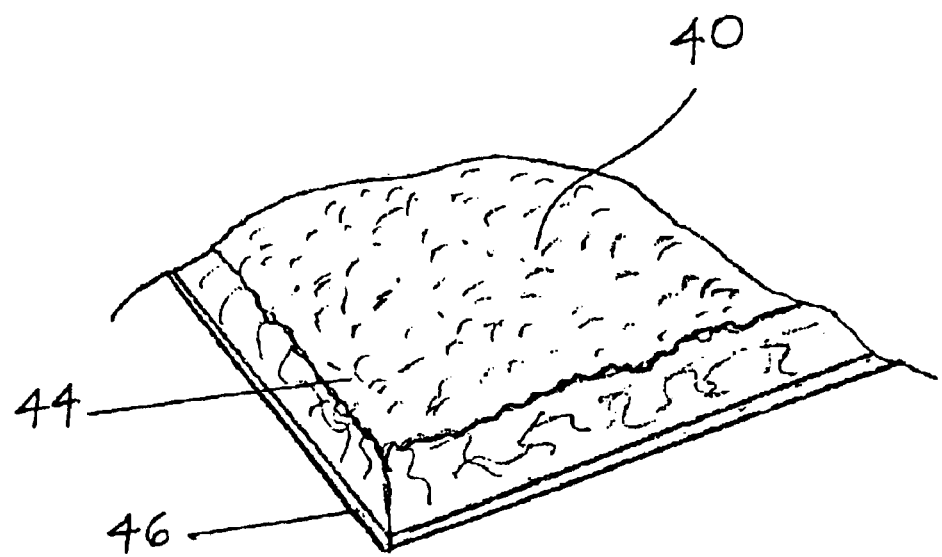
FIG. 2C is a partial isometric view of the sand bunker liner shown in FIG. 2A.
Figure 2D:
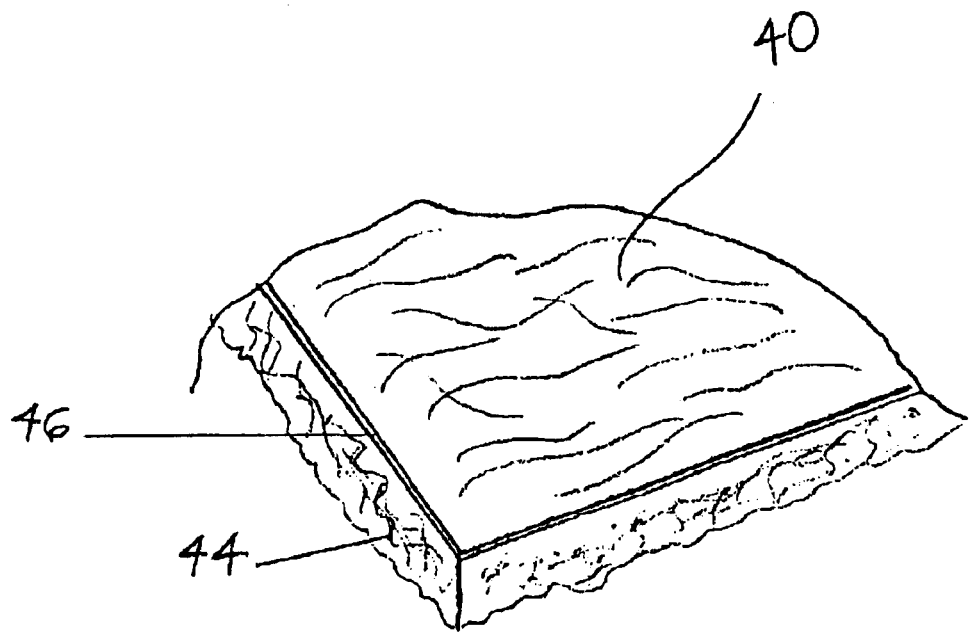
FIG. 2D is a partial isometric view of the sand bunker liner shown in FIG. 2A with the backing layer facing upward.

Reference is now made to FIGS. 2A through 2D which are different views of a sand bunker liner of the present invention. As shown in FIG. 2A, liner 40 is typically sold on a roll 42 having a width W, which may be on the order of three to six feet, and a length on the order of 50 feet. As shown best in FIGS. 2C–2D, liner 40 is formed of two layers—upper layer 44 and backing layer 46. Upper layer 44 is a coarse web of non-woven synthetic fibers having a thickness T1 which may range from 0.25 to 0.75 inches, and is preferably on the order of 0.50 inches. Upper layer 44 is water permeable and sufficiently coarse and porous so that it absorbs sand and holds it firmly in place within a bunker even along steep slopes of up to 60°. Coarse fiber web 44 is preferably an air-laid fabric, but may also be formed by other methods known in the art, e.g., carded, garnetted, wet-laid, or melt-blown. Thinner backing layer 46, which may range from 0.005 to 0.020 inches in thickness, and is preferably on the order of 0.007 inches, is also water permeable and is preferably formed of a synthetic spunbond fabric, e.g., LUTRADUR® polyester spunbond fabric. Backing layer 46 is configured to prevent downward migration of sand through liner 40 where it may clog the bunker drain (not shown). Weight of spunbond backing layer 46 may range 0.4 oz./sq. yd. to 6.0 oz/sq. yd., and is preferably on the order of 1.0 oz./sq. yd. Advantageously, backing layer 46 also prevents the upward migration of pebbles, rocks, dirt and other contaminants to the playing surface and keeps weeds from growing up from the underlying soil into the bunker.

In a preferred embodiment, backing layer 46 is joined to upper layer 44 by needlepunching the coarse fiber web 44 into spunbond backing layer 46. The combined liner 40 is then sprayed with a bonding resin, oven dried and cured. In alternate embodiments, upper layer 44 and backing layer 46 may be joined by an adhesive or other bonding agent. In still another embodiment, the liner may be formed of thermally bondable fibers which are needlepunched into a spunbond scrim backing layer and then thermally activated so that the outer layer of fibers acts like a hot melt adhesive to bond adjacent fibers together. It should be noted that FIG. 2D, which shows backing layer 46 above fiber web layer 44, is for illustration purposes only and that liner 40 should not be installed with backing layer 46 facing up. Liner 40 should only be installed with fiber web layer 44 facing up toward the sand while backing layer 46 rests against the native soil.

Figure 3:
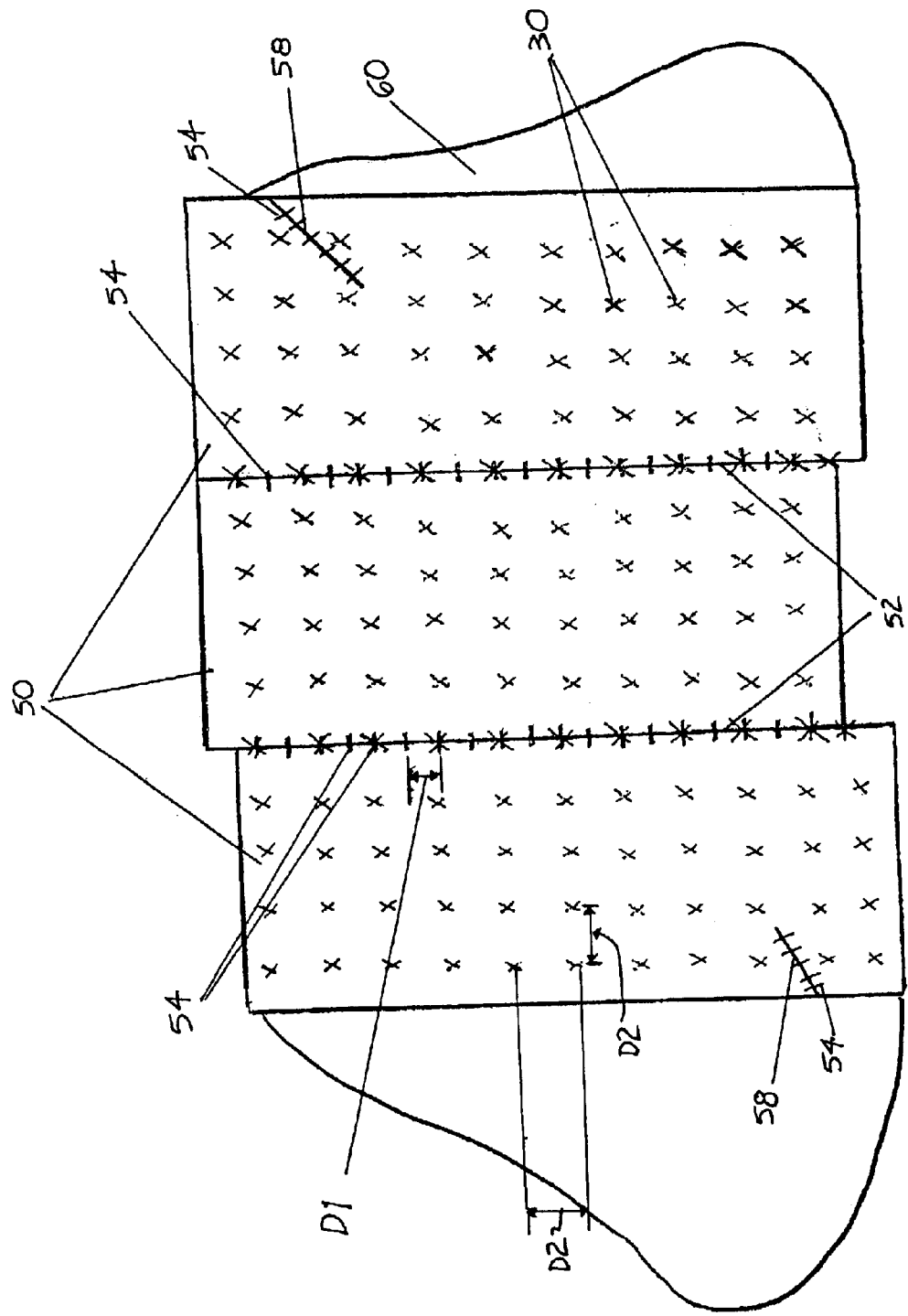
FIG. 3 is a top view of an unfilled sand bunker illustrating a method for installing a sand bunker liner according to the present invention.

Reference is now made to FIG. 3, which is a top view of an unfilled sand bunker illustrating a preferred method for installing a sand bunker liner according to the present invention. Sections or sheets 50 of liner 40 are laid within unfilled bunker 60 and are cut as necessary to fit the contours of bunker 60. Preferably, sheets 50 are laid within bunker so that seams 52 are parallel to both the flow of water within the bunker and the direction of shots from players. Edges at the seams 52 between adjacent sheets 50 are abutted and joined together using "seam staples" 54, which are not sod staples 30. In alternate embodiments, edges of adjacent sheets may be overlapped slightly before being joined with staples 54.

Figure 5:
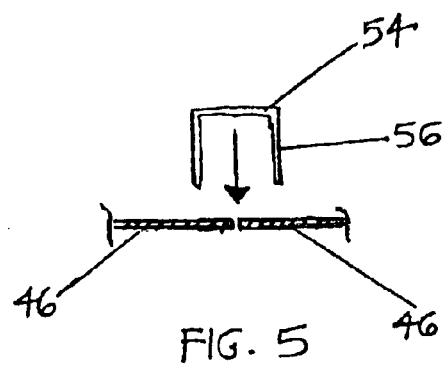
FIG. 5 is a side view of a typical staple used to join seams of adjacent sections of the sand bunker liner of the present invention.

As shown in FIG. 5, staples 54 may be a heavy-duty, steel staple having a pair of downwardly extending legs 56 that penetrate backing layers 46 of adjacent, abutted sheets 50. Staples 54 may range in width from about 1.0 to 1.50 inches and in leg length from about 0.5 to 0.75 inches. In a preferred application, staples 54 are about 1.375 inches wide by 0.625 inches in leg length, and are formed of galvanized or copper treated steel.

Figure 5A:
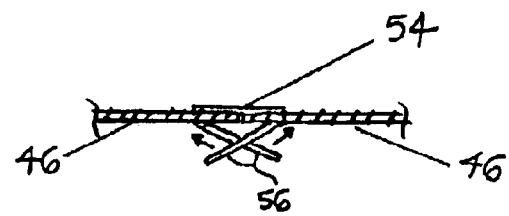
FIG. 5A is a side view of the staple shown in FIG. 5 penetrating the backing layer of overlapped sections of the sand bunker liner of the present invention.
Figure 6:
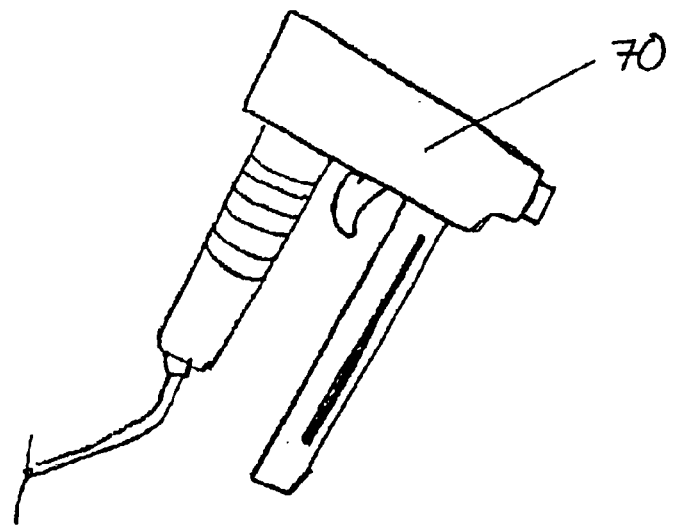
FIG. 6 is a side view of a device for installing staples to join seams of adjacent sections of the sand bunker liner according to the present invention.

As shown in FIG. 5A, legs 56 of staples 54 penetrate abutted backing layers 46 and then fold inwardly toward one another, grabbing backing layers 46 of adjacent sheets 50 and binding them together. (It should be noted that for purposes of clarity, fiber web layer 44 has been purposely omitted from FIGS. 5 & 5A, and the thickness of backing layer 46 has been exaggerated.) Unlike hand-driven sod staples 30, seam staples 54 do not penetrate the native soil and are much faster and easier to install. Staples 54 are preferably installed using a pneumatic stapler 70 (see FIG. 6), e.g., Stanley-Bostitch® Stapler Model D16-2AD or Kilburg Model D19AD but may also be installed using other types of mechanical staple drivers. Staples 54 are typically spaced at a distance D1 to create a tight seam between adjacent sheets 50, where D1 may range from three to eight inches, and is preferably on the order of six inches. Sheets 50 of liner 40 are then anchored to the native soil using a plurality of sod staples 30, which may be spaced a distance D2 both within a given sheet 50 and along the seams 52 between sheets 50, where D2 is greater than D1, and is typically on the order of twelve inches. In addition, since "relief" cuts 58 through the liner are often necessary to properly fit the liner to the contours of a bunker, staples 54 can be used to join adjacent edges of a relief cut 58 once the liner is properly fit to the bunker.

A comparison of the prior art method shown in FIG. 1 to the method of the present invention shown in FIG. 3 demonstrates that the number of hand-driven sod staples required for a given installation, and, therefore, the amount of hand labor by golf course maintenance crews, is significantly reduced.

In contrast to the prior art erosion control mats, the backing layer 46 of liner 40 of the present invention is sufficiently dense to allows staples 54 to firmly grip backing layer 46 to create tight seams 52 between sheets 50. Preferably, backing layer 46 is separated and removed from fiber web layer 44 at the edges of bunker 60, so that sod adjacent to the bunker may better adhere to the fiber web layer 44 and further secure liner 40 to the native soil.

While the present invention has been described with reference to the preferred embodiments, those skilled in the art will recognize that numerous variations and modifications may be made without departing from the scope of the present invention. Accordingly, it should be clearly understood that the embodiments of the invention described above are not intended as limitations on the scope of the invention, which is defined only by the following claims.

What is claimed is:

1. A liner for preventing erosion and maintaining playability of golf course sand bunkers comprising:
   a first non-woven layer formed of randomly-aligned, synthetic fibers, the first layer configured and adapted to maintain sand in place within a sand bunker; and
   a second backing layer formed of spunbond synthetic fiber secured to the first layer, the second layer configured and adapted to prevent downward migration of sand through the liner, while also preventing the upward migration of weeds, rocks and other contaminants that hinder the playability of the sand bunker
   wherein the first and second layers are water permeable.

2. The liner of claim 1, wherein the second layer is configured and adapted to permit seams between adjacent sections of the liner to be joined by staples that penetrate the second layer but do not penetrate soil.

3. The liner of claim 1, wherein the second layer is secured to the first layer by needlepunching the second layer to the first layer.

4. The liner of claim 1, wherein the first layer and second layer are sprayed with a bonding resin, dried and cured.

5. The liner of claim 1, wherein the second layer is secured to the first layer by an adhesive.

6. The liner of claim 1, wherein the first layer is formed of polyester.

7. The liner of claim 1, wherein the second layer is formed of polyester.

8. The liner of claim 1, wherein the first layer includes thermobondable fibers that bond with adjacent fibers when heat activated to form a durable web.

9. A method of installing a liner for preventing erosion and maintaining playability of a golf course sand bunker comprising:
   fitting sections of a water-permeable liner within an unfilled sand bunker, the liner having a first layer configured and adapted for maintaining sand in place within the sand bunker and a second backing layer that is impervious to sand;
   cutting the liner to fit contours of the unfilled sand bunker as necessary;
   anchoring the liner to the bunker base using a plurality of sod staples; and
   joining seams between adjacent sections of the liner using staples that are not sod staples and are configured and adapted to penetrate the backing layer of the liner but not penetrate soil.

10. The method of claim 9, wherein both the sod staples and the staples used to join the seams between adjacent sections of the liner have legs, and the legs of the sod staples are longer than the legs of the staples used to join the seams between adjacent sections of the liner.

11. The method of claim 10, wherein the legs of the staples used to join the seams between adjacent sections of the liner fold toward one another after penetrating the backing layer of adjacent sections of the liner.

12. The method of claim 9, wherein the staples used to join the seams between adjacent sections of the liner are installed using a hand-held, pneumatic stapler.

13. The method of claim 9, wherein the staples used to join the seams between adjacent section of the liner are spaced at about four to six inches on center.

14. The method of claim 9, further comprising the steps of:
   making relief cuts in the liner to better fit sections of the liner to contours of the unfilled bunker; and
   joining adjacent edges of the relief cuts using the staples that are configured and adapted to penetrate the backing layer of the liner but not penetrate soil.

15. The method of claim 9, wherein the first layer is non-woven.

16. The method of claim 9, wherein the backing layer is formed of spunbond synthetic fiber secured to the first layer.

17. The method of claim 9, further comprising the step of:
   separating and removing the second backing layer from the first layer at a perimeter edge of the bunker to permit sod to adhere to the liner.

18. The method of claim 9, where the first layer is formed of randomly aligned fibers.

19. The method of claim 9, wherein the first layer is formed of synthetic fibers.

20. A system for preventing erosion and maintaining playability of golf course sand bunkers comprising:
   a plurality of sections of a water permeable liner, the liner comprising a first non-woven layer formed of randomly-aligned, synthetic fibers, the first layer configured and adapted for maintaining sand in place within a sand bunker, and a second backing layer formed of spunbond synthetic fiber secured to the first layer, the second layer configured and adapted to prevent downward migration of sand through the liner, while also preventing the upward migration of weeds, rocks and other contaminants that hinder the playability of the sand bunker;
   a plurality of sod staples for securing the liner to the bunker base after it has been cut and fit to the bunker;
   a plurality of seam staples for joining seams between adjacent sections of the liner after it has been cut and fit to the bunker, the seam staples configured and adapted to penetrate the backing layer of the liner but not penetrate soil; and
   a coupling device for installing the plurality of seam staples.

21. The system of claim 20, wherein the coupling device is a hand-held, pneumatic stapler.

22. A liner for preventing erosion and maintaining playability of golf course sand bunkers comprising:

first non-woven layer formed of synthetic fiber, the first layer configured and adapted to maintain sand in place within a sand bunker; and a second backing layer secured to the first layer, the second layer configured and adapted to prevent downward migration of sand through the liner, while also preventing the upward migration of weeds, rocks and other contaminants that hinder the playability of the sand bunker wherein the first and second layers are water permeable.

23. The liner of claim 22, wherein the second layer is configured and adapted to permit seams between adjacent sections of the liner to be joined by staples that penetrate the second layer but do not penetrate soil.

24. The liner of claim 22, wherein the second layer is secured to the first layer by needlepunching the second layer to the first layer.

25. The liner of claim 22, wherein the first layer and second layer are sprayed with a bonding resin, dried and cured.

26. The liner of claim 22, wherein the second layer is secured to the first layer by an adhesive.

27. The liner of claim 22, wherein the first layer is formed of randomly aligned fibers.

28. The liner of claim 22, wherein the second layer is formed of synthetic fibers.

29. The liner of claim 22, wherein the first layer includes thermobondable fibers that bond with adjacent fibers when heat activated to form a durable web.

* * * * *